United States Patent Office 3,073,958
Patented Jan. 15, 1963

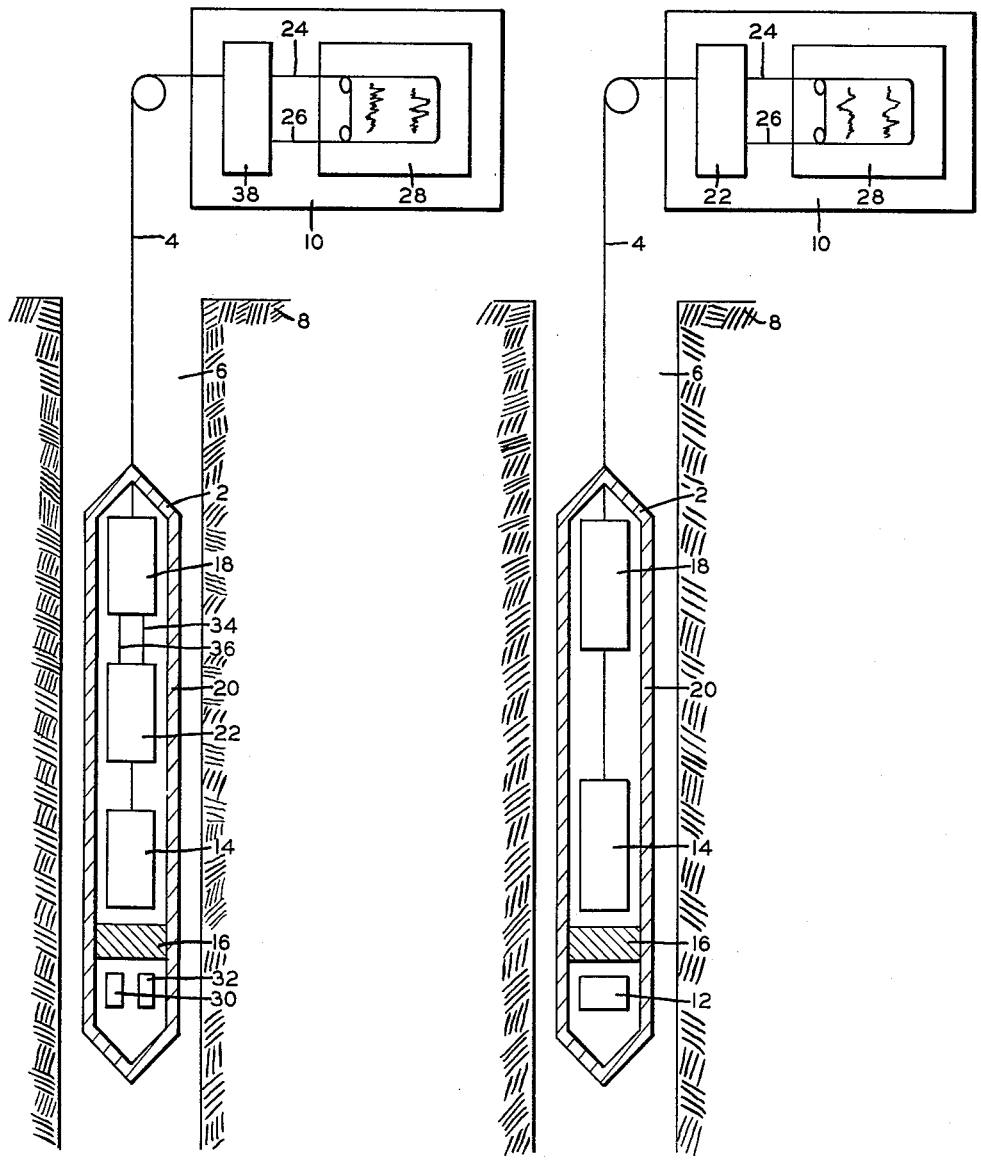

3,073,958
APPARATUS FOR SIMULTANEOUS NEUTRON AND PHOTON LOGGING WITH A SINGLE DETECTOR
Arthur H. Youmans, Tulsa, Okla., assignor to Well Surveys, Incorporated, a corporation of Delaware
Filed Apr. 30, 1959, Ser. No. 809,959
8 Claims. (Cl. 250—83.3)

This invention relates to nuclear logging and is particularly directed to novel methods and apparatus for simultaneous neutron and photon logging with a single detector.

In the art of nuclear well logging, a subsurface instrument is traversed through a borehole suspended by a cable which also provides electrical connection between the subsurface instrument and a suitable surface unit located at the surface of the earth. The subsurface instrument normally contains a source of radiation for irradiating the formations surrounding the borehole together with one or more radiation detectors for detecting radiation present in the borehole as a result of irradiation from the source.

The source contained in the subsurface instrument may emit gamma rays, neutrons or both. When a gamma ray source is employed, the detector must be responsive to gamma rays and will detect those gamma rays which have been scattered by the formations as a result of the gamma irradiation and which have returned to the borehole. Logs made of these scattered gamma rays provide information concerning the density and radiation scattering properties of the formations surrounding the borehole. If a neutron source is employed, the detector may be responsive either to scattered neutrons or to gamma rays emitted by the formations as a result of neutron irradiation. The gamma rays resulting from neutron irradiation have to a large extent, considerably higher energies than the scattered gamma rays. The scattered neutrons (the measurement of which is frequently called the "neutron-neutron" log) and the high energy gamma rays (the measurement of which is frequently called the "neutron-gamma ray" log) resulting from neutron irradiation each provide information concerning the chemical and physical properties of the rock and the quantity and location of fluid deposits, and the composition of the fluids, contained in such deposits. Unfortunately, the neutron-neutron and neutron-gamma ray logs as they are known in the art both often fail to distinguish shales from fluid filled deposits. However, the density of the shale will be substantially different from that of the fluid deposits and this can be clearly shown by the so-called gamma-gamma or scattered gamma ray log. Thus, it is clearly advantageous to run the gamma-gamma log together with either the neutron-neutron or the neutron-gamma log.

Numerous methods and apparatus have been suggested heretofore for accomplishing this combination of logs simultaneously. However, none of the prior art methods or apparatus have been entirely satisfactory. All of the subsurface instruments employed in prior art systems have required the use of two independent radiation detectors. Each of these detectors required considerable additional electronic circuitry. Consequently, the instruments required to accomplish this type of logging have been bulky, expensive and electronically complicated. Moreover, when separate detectors are employed, they cannot occupy identical positions in the subsurface instrument. Thus, the source to detector spacings, environmental characteristics and other influencing factors will be different for each of the detectors. This will have considerable effect on the logs made with such instruments and render them more difficult to interpret.

These disadvantages of the prior art are overcome with the present invention and novel methods and apparatus are provided which permit scattered gamma ray logs to be made simultaneously with either neutron-neutron or neutron-gamma logs and at identical positions in the subsurface instrument. Accordingly, the source to detector spacings, environmental characteristics and the like are identical for both logs. Thus, the logs may be readily compared to accurately locate and determine the characteristics of zones of interest.

The advantages of the present invention are preferably attained by irradiating the formations surrounding the borehole with both gamma rays and neutrons and detecting the resulting radiation with a single detector which produces pulse-type electrical signals that are functionally related to the energy of the radiation incident on the detector. As noted previously, the gamma rays resulting from neutron irradiation have, to a large extent, considerably higher energies than the scattered gamma rays. Consequently, by separating the pulses produced by the detector on the basis of the energy of the incident radiation, two independent signal transmission channels may be established. This may be accomplished conveniently by means of a discriminator or the like. One of these signal channels will be supplied with those pulses relating to radiations incident on the detector with energies greater than the energies of substantially all of the scattered gamma rays. Thus, this channel will indicate the flux of scattered neutrons or gamma rays resulting from neutron irradiation of the formations. The other signal channel will be supplied with those pulses relating to radiations incident on the detector with energies corresponding to the energies of the scattered gamma rays. It will be apparent to those skilled in the art that some of the gamma rays resulting from neutron bombardment will be scattered in the formations and will reach the detector with energies in the range of the gamma-gamma log. Moreover, these gamma rays will be indistinguishable from those of the gamma-gamma log. However, by employing a gamma ray source of sufficiently great strength, the effect of the scattered neutron-gamma rays can be minimized. Furthermore, the effect of the neutron-gamma rays can be further reduced by employing pulse height selecting circuitry which will supply the first signal channel with only those pulses from the detector which are indicative of radiations incident on the detector with energies above a predetermined level and which will supply the other signal channel with only those pulses which are indicative of radiations incident on the detector with energies greater than the minimum detectable energy but less than the energy of the pulses supplied to the first signal channel. The signals in each of the transmission channels may then be independently recorded and the records or "logs" may be compared for interpretation. The circuitry for separating the signals into the respective channels may be located in either the subsurface or the surface equipment. It will be seen that this novel method of logging permits the elimination of one detector and its attendant electronic circuitry. Thus, the size of the subsurface instrument may be considerably reduced and the cost, weight and complexity of the instrument may be proportionately lessened. Consequently, the apparatus is cheaper to build and easier to handle and maintain than the apparatus of the prior art.

Accordingly, it is an object of the present invention to provide novel methods and apparatus for nuclear well logging which permits a scattered gamma ray log to be made simultaneously with either a neutron-neutron or a neutron-gamma log at identical source to detector spacings and with identical environmental characteristics.

Another object of the present invention is to provide novel methods and apparatus for nuclear well logging which permit a scattered gamma ray log and either a neutron-neutron or neutron-gamma log to be made simultaneously with a single detector.

A further object of the present invention is to provide novel methods of nuclear logging which permit a scattered gamma ray log and either a neutron-neutron or neutron-gamma log to be made simultaneously and which permit the logs so made to be readily compared to accurately locate zones of interest.

An additional object of the present invention is to provide novel apparatus for nuclear logging which permits a scattered gamma ray log to be made simultaneously with either a neutron-neutron or neutron-gamma log and which is cheaper to build and easier to handle and maintain than the apparatus of the prior art.

A specific object of the present invention is to provide a novel method of nuclear well logging comprising the steps of irradiating the material outside the casing of a cased borehole with both gamma rays and neutrons, measuring radiations resulting from irradiating said material with gamma rays and radiations resulting from irradiating said material with neutrons, establishing a first electrical signal indicative of said radiations resulting from gamma ray irradiation, establishing a second electrical signal indicative of said radiations resulting from neutron irradiation, and independently recording said signals.

Another specific object of the present invention is to provide novel apparatus for nuclear well logging comprising a source of gamma rays and neutrons, a single radiation detector producing electrical signals indicative of radiations incident on said detector, means establishing two independent signal channels, means connected to receive signals from said detector and serving to supply one of said channels with signals corresponding to radiations incident on said detector as a result of gamma rays emitted from said source, means connected to receive signals from said detector and serving to supply the other of said channels with signals corresponding to radiations incident on said detector as a result of neutrons emitted from said source, and means for recording the signals in each of said channels.

These and other objects and features of the present invention will be apparent from the following detailed description wherein reference is made to the figures of the accompanying drawing.

In the drawing:

FIG. 1 is a view, partly in section, showing typical well logging apparatus embodying the present invention with the subsurface instrument suspended in a borehole; and FIG. 2 is a view, similar to that of FIG. 1, showing a modified form of well logging apparatus embodying the present invention.

In that form of the invention chosen for purposes of illustration in the drawing, FIG. 1 shows a subsurface instrument 2 suspended by means of a cable 4 in a borehole 6 which penetrates the earth 8. The cable 4 serves to suspend the subsurface instrument 2 in the borehole 4 and also provides electrical connection between the subsurface instrument 2 and a suitable surface unit 10. The subsurface instrument 2 comprises a radiation source 12, such as a radium-berryllium source, which emits both gamma rays and neutrons. A single radiation detector 14 is mounted in the subsurface instrument 2 and is spaced a predetermined distance from the source 12. The area between the source 12 and detector 14 is preferably filled with suitable radiation shielding material 16 to prevent radiations from passing directly from the source 12 to the detector 14 without penetrating the surrounding earth 8.

The radiation detector 14 may be any conventional type of detector which produces pulse-type electrical signals indicative of the energy or the type of the radiation incident on the detector 14. With such detectors the output pulses are uniquely or monotonically related to the energy dissipated in the detection medium thereof by respective incident radiations. Thus, proportional counters or scintillation counters may be employed. Where the scattered gamma ray log is to be made simultaneously with a neutron-neutron log, the detector 14 must, of course, be responsive to both gamma rays and neutrons. However, where the scattered gamma ray log is to be made simultaneously with the neutron-gamma ray log, the detector 14 need only be responsive to gamma rays. The output pulses from the detector 14 are preferably passed to a suitable signal processing circuit 18, which may include appropriate amplifying and pulse shaping circuits, and which prepares the detector output pulses for transmission over the cable 4 to the surface unit 10. In addition, the entire subsurface instrument 2 is enclosed in a suitable pressure resistant housing 20.

In the surface unit 10, the detector output pulses are passed to a suitable discriminator 22. This discriminator 22 separates the detector output pulses into two separate signal channels 24 and 26 according to the energy of the radiation indicated by the respective pulses. It has been found that substantially all scattered gamma rays reach the detector with energies less than 1.5 mev. whereas a large number of scattered neutrons and gamma rays resulting from neutron irradiation reach the detector with energies above 1.5 mev. Thus, the discriminator 22 may be set to supply one of the signal channels, for example, channel 24, with those pulses corresponding to radiations incident on the detector 14 with energies greater than 1.5 mev. and to supply the other signal channel, in this case, channel 26, with those pulses corresponding to radiations incident on the detector 14 with energies less than 1.5 mev. In this way, the signals in channel 24 will be indicative of the flux of neutrons or gamma rays resulting from neutron irradiation, whereas the signals in channel 26 will be indicative of the flux of scattered gamma rays. The signals in channels 24 and 26 are then separately supplied to a suitable recorder 28 where the signals in each channel are independently recorded in correlation with depth. Since the same detector is employed for making both of these records or "logs," both logs will be made with the same source to detector spacing and will be subjected to the same environmental characteristics. Thus, the logs may be readily compared by anyone familiar with log interpretation and will accurately indicate the zones of interest.

As shown in FIG. 2, it may be desirable in some instances to employ separate sources for the gamma rays and neutrons. Thus, source 30 may be a neutron source which emits no gamma rays, such as a plutonium-beryllium source or an accelerator source, while source 32 may be a gamma ray source which emits no neutrons, such as a cesium source.

Moreover, if desired, the discriminator 22 may be mounted in the subsurface instrument 2, as shown in FIG. 2, and may be connected to receive the pulses from detector 14 directly. The pulses are separated according to energy by discriminator 22, in the manner described above, and are supplied to respective independent signal channels 34 and 36 which pass the signals to the signal processing circuit 18. In this case, the signal processing circuit 18 includes independent amplifiers and pulse shaping circuits for each of the signal channels 34 and 36 together with suitable modulation circuits or the like for impressing the signals on the cable 4 for simultaneous independent transmission to the surface unit 10. In the surface unit 10, the signals are passed to a suitable signal separating circuit 38 which includes appropriate circuitry for demodulating or otherwise re-separating the signals into their respective channels. The signals are then passed by independent signal channels 24 and 26 to the recorder 28, as described above with respect to FIG. 1. It will be understood that use of common or independent gamma ray and neutron sources and the location of discriminator 22 in the subsurface instrument 2 or surface unit 10 are matters of choice and all permutations and combinations of these features are contemplated by the present invention.

In addition, numerous other variations and modifications may obviously be made without departing from the invention. Accordingly, it should be clearly understood that those forms of the invention described above and shown in the figures of the accompanying drawing are illustrative only and are not intended to limit the scope of the invention.

What I claim is:

1. Apparatus for nuclear logging of earth formations about a borehole comprising source means emitting gamma rays and neutrons, a radiation detector disposed relative to said source means so that radiations are incident thereon as a result of irradiation of said formations by radiations from said source means, said detector producing electrical pulses with magnitudes related to the energy dissipated in the detection medium of said detector upon incidence thereon of respective radiations, means connected to said detector for deriving groups of pulses from said electrical pulses by pulse magnitude selection, a first of said groups including a greater proportion than a second of said groups of pulses corresponding to radiations resulting from irradiation of said formations by gamma rays from said source means and said second of said groups including a greater proportion than said first of said groups of pulses corresponding to radiations resulting from irradiation of said formations by neutrons from said source means, and means for separately utilizing said first and second groups of pulses to provide separate indications of the radiations from the formations resulting from irradiation thereof by gamma rays and neutrons, respectively, emitted by said source means.

2. Apparatus for nuclear logging of earth formations about a borehole comprising source means emitting gamma rays and neutrons, a radiation detector disposed relative to said source means so that radiations are incident thereon as a result of irradiation of said formations by radiations from said source means, said detector producing electrical pulses with magnitudes related to the energy dissipated in the detection medium of said detector upon incidence thereon of respective radiations, means connected to said detector for deriving from said electrical pulses by pulse magnitude selection a first group of pulses including a greater proportion than a second group of pulses corresponding to radiations resulting from irradiation of said formations by gamma rays from said source means, means connected to said detector for deriving from said electrical pulses by pulse magnitude selection a second group of pulses including a greater proportion than said first of said groups of pulses corresponding to radiations resulting from irradiation of said formations by neutrons from said source means, and means for separately utilizing said first and second groups of pulses to provide separate indications of the radiations from the formations resulting from irradiation thereof by gamma rays and neutrons, respectively, emitted by said source means.

3. Apparatus for nuclear logging of earth formations about a borehole comprising a radiation source emitting both gamma rays and neutrons, a radiation detector disposed relative to said source so that radiations are incident thereon as a result of irradiation of said formations by radiations from said source, said detector producing electrical pulses with magnitudes related to the energy dissipated in the detection medium of said detector upon incident thereon of respective radiations, means connected to said detector for deriving from said electrical pulses by pulse magnitude selection a first group of pulses including a greater proportion than a second group of pulses corresponding to radiations resulting from irradiation of said formations by gamma rays from said source, means connected to said detector for deriving from said electrical pulses by pulse magnitude selection a second group of pulses including a greater proportion than said first of said groups of pulses corresponding to radiations resulting from irradiation of said formations by neutrons from said source, and means for separately utilizing said first and second groups of pulses to provide separate indications of the radiations from the formations resulting from irradiation thereof by gamma rays and neutrons, respectively, emitted by said source.

4. Apparatus for nuclear logging of earth formations about a borehole comprising source means emitting gamma rays and neutrons; a radiation detector disposed relative to said source means so that radiations are incident thereon as a result of irradiation of said formations by radiations from said source means, said detector producing electrical pulses with magnitudes related to the energy dissipated in the detection medium of said detector upon incidence thereon of respective radiations; means connected to said detector for deriving groups of pulses from said electrical pulses by pulse magnitude selection, a first group of pulses including only pulses greater than a predetermined magnitude, said predetermined magnitude being larger than substantially all pulses produced by said detector from the most energetic of the scattered gamma rays incident on said medium as a result of irradiation of said formations by gamma rays from said source means, and a second group of pulses including a relatively large proportion of pulses of lesser magnitudes, said lesser magnitudes being within the range of pulses produced by said detector from gamma rays of energy substantially less than the most energetic of said gamma rays from said source means, said source means having a rate of emission of gamma rays relative to its rate of emission of neutrons sufficient to provide a rate of incidence of scattered gamma rays within said range incident upon said detector as a result of irradiation of said formations by gamma rays from said source means which rate is large relative to the rate of incidence of radiations incident upon said detector as a result of irradiation of said formations by neutrons from said source means; and means for separately utilizing said first and second groups of pulses to provide separate indications of the radiations from the formations resulting from irradiation thereof by neutrons and gamma rays, respectively, emitted by said source means.

5. Apparatus for nuclear logging of earth formations about a borehole comprising source means emitting gamma rays and neutrons, a radiation detector disposed relative to said source means so that radiations are incident thereon as a result of irradiation of said formations by radiations from said source means, said detector producing electrical pulses with magnitudes related to the energy dissipated in the detection medium of said detector upon incidence thereon of respective radiations, means connected to said detector for deriving from said electrical pulses by pulse magnitude selection a first group of pulses including only pulses greater than a predetermined magnitude, said predetermined magnitude being larger than substantially all pulses produced by said detector from the most energetic of the scattered gamma rays incident upon said medium as a result of irradiation of said formations by gamma rays from said source means, means connected to said detector for deriving from said electrical pulses by pulse magnitude selection a second group of pulses including a relatively large proportion of pulses of lesser magnitudes, said lesser magnitudes being within the range of pulses produced by said detector from gamma rays of energy substantially less than the most energetic of said gamma rays from said source means, said source means having a rate of emission of gamma rays relative to its rate of emission of neutrons sufficient to provide a rate of incidence of scattered gamma rays incident upon said detector as a result of irradiation of said formations by gamma rays from said source means which incidence rate is large relative to the rate of incidence of radiations incident upon said detector as a result of irradiation of said formations by neutrons from said source means, and means for separately utilizing said first and second groups of pulses to provide separate indications of the radiations from the formations resulting from irradiation thereof by neutrons and gamma rays, respectively, emitted by said source means.

6. Apparatus for nuclear logging of earth formations about a borehole comprising source means emitting gamma rays and nutrons, a radiation detector disposed relative to said source means so that radiations are incident thereon as a result of irradiation of said formations by radiations from said source means, said detector producing electrical pulses with magnitudes related to the energy dissipated in the detection medium of said detector upon incidence thereon of respective radiations, means connected to said detector for deriving from said electrical pulses by pulse magnitude selection a first group of pulses including only pulses greater than a predetermined magnitude, said predetermined magnitude being larger than substantially all pulses produced by said detector from the most energetic of the scattered gamma rays incident upon said medium as a result of irradiation of said formations by gamma rays from said source means, means connected to said detector for deriving from said electrical pulses by pulse magnitude selection a second group of pulses including only pulses less than said preedtermined magnitude, said source means having a rate of emission of gamma rays relative to its rate of emission of neutrons sufficient to provide a rate of incidence of scattered gamma rays incident upon said detector as a result of irradiation of said formations by gamma rays from said source means which rate is large relative to the rate of incidence of radiations incident upon said detector as a result of irradiation of said formations by neutrons from said source means, and means for separately utilizing said first and second groups of pulses to provide separate indications of the radiations from the formations resulting from irradiation thereof by neutrons and gamma rays, respectively, emitted by said source means.

7. Apparatus for nuclear logging of earth formations about a borehole having a subsurface unit and a surface unit connected by a logging cable, said apparatus comprising source means emitting gamma rays and neutrons disposed in said subsurface unit, a radiation detector disposed in said subsurface unit relative to said source means so that radiations are incident thereon as a result of irradiation of said formations by radiations from said source means, said detector producing electrical pulses with magnitudes related to the energy dissipated in the detection medium of said detector upon incidence thereon of respective radiations, discriminator means also disposed in said subsurface unit and connected to said detector and operable in a first position to derive from said electrical pulses by pulse magnitude selection a first group of pulses including only pulses greater than a predetermined magnitude, said predetermined magnitude being larger than substantially all pulses produced by said detector from the most energetic of the scattered gamma rays incident upon said medium as a result of irradiation of said formations by gamma rays from said source means, and operable in a second position to derive from said electrical pulses by pulse magnitude selection a second group of pulses including a relatively large proportion of pulses of lesser magnitudes, said lesser magnitudes being within the range of pulses produced by said detector from gamma rays of energy substantially less than the most energetic of said gamma rays from said source, said source means having a rate of emission of gamma rays relative to its rate of emission of neutrons sufficient to provide a rate of incidence of scattered gamma rays within said range incident upon said detector as a result of irradiation of said formations by gamma rays from said source means which rate is large relative to the rate of incidence of radiations incident upon said detector as a result of irradiation of said formations by neutrons from said source means, means operable from said surface unit for switching said discriminator from one of said first and second positions to the other, and means for separately utilizing said first and second groups of pulses to provide separate indications of the radiations from the formations resulting from irradiation thereof by neutrons and gamma rays, respectively, emitted by said source means.

8. Apparatus for nuclear logging of earth formations about a borehole having a subsurface unit and a surface unit connected by a logging cable, said apparatus comprising source means emitting gamma rays and neutrons disposed in said subsurface unit, a radiation detector disposed in said subsurface unit relative to said source means so that radiations are incident thereon as a result of irradiation of said formations by radiations from said source means, said detector producing electrical pulses with magnitudes related to the energy dissipated in the detection medium of said detector upon incidence thereon of respective radiations, pulse magnitude discriminator means also disposed in said subsurface unit and connected to said detector and operable in a first position to derive from said electrical pulses a first group of pulses including only pulses greater than a pulse produced by said detector by the dissipation therein of all the energy of a 1.5 Mev gamm ray, and operable in a second position to derive from said electrical pulses a second group of pulses including pulses of lesser magnitudes down to those corresponding to gamma rays of the minimum detectable energy, said source means having a rate of emission of gamma rays relative to its rate of emission of neutrons sufficient to provide a rate of incidence of scattered gamma rays incident upon said detector as a result of irradiation of said formations by gamma rays from said source means which rate is large relative to the rate of incidence of radiations incident upon said detector as a result of irridation of said formations by neutrons from said source means, means operable from said surface unit for switching said discriminator from one of said first and second positions to the other, and means for separately utilizing said first and second groups of pulses to provide separate indications of the radiations from the formations resulting from irradiation thereof by neutrons and gamma rays, respectively, emitted by said source means.

References Cited in the file of this patent
UNITED STATES PATENTS

| | | |
|---|---|---|
| 2,648,012 | Scherbatskoy | Aug. 4, 1953 |
| 2,752,504 | McKay | June 26, 1956 |
| 2,755,389 | Jones et al. | July 17, 1956 |
| 2,785,314 | Grahame | Mar. 12, 1957 |